US007783589B2

(12) United States Patent
Hornkvist et al.

(10) Patent No.: US 7,783,589 B2
(45) Date of Patent: Aug. 24, 2010

(54) INVERTED INDEX PROCESSING

(75) Inventors: John Martin Hornkvist, Cupertino, CA (US); Eric Richard Koebler, Aptos, CA (US); Wayne Loofbourrow, San Jose, CA (US); Yun-chih S. Li, Los Altos, CA (US); Yan Arrouye, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 11/499,038

(22) Filed: Aug. 4, 2006

(65) Prior Publication Data
US 2008/0033909 A1 Feb. 7, 2008

(51) Int. Cl.
*G06F 17/30* (2006.01)
(52) U.S. Cl. .......................................................... 707/2
(58) Field of Classification Search ................... 707/2, 707/5, 202, 204, 1, 715, 637; 715/200
See application file for complete search history.

(56) References Cited

U.S. PATENT DOCUMENTS

| 5,375,235 | A | * | 12/1994 | Berry et al. ................ 707/5 |
| 5,613,110 | A | | 3/1997 | Stuart |
| 5,845,273 | A | | 12/1998 | Jindal |
| 5,915,249 | A | * | 6/1999 | Spencer .................... 707/5 |
| 6,374,266 | B1 | * | 4/2002 | Shnelvar .................. 707/204 |
| 6,421,675 | B1 | * | 7/2002 | Ryan et al. ................ 707/100 |
| 6,922,708 | B1 | * | 7/2005 | Sedlar ...................... 707/202 |
| 2002/0178276 | A1 | * | 11/2002 | McCartney et al. ........ 709/231 |
| 2005/0165750 | A1 | * | 7/2005 | Shakib et al. ................ 707/3 |
| 2006/0117002 | A1 | * | 6/2006 | Swen ........................ 707/4 |
| 2008/0104102 | A1 | | 5/2008 | Zhang |

OTHER PUBLICATIONS

Joerg Meyer, Large Scale Multi-Type Inverted list indexing, Mar. 2005, University of California Santa Cruz, 46 pages.*
Lester et al., Efficient online index maintenance for continuous inverted lists, 25 pages.*
Lester, Nicholas et al. "Efficient online index maintenance for continuous inverted lists," *Information Processing and Management*, 42 (2006) pp. 916-933.

* cited by examiner

*Primary Examiner*—John R. Cottingham
*Assistant Examiner*—Noosha Arjomandi
(74) *Attorney, Agent, or Firm*—Blakely, Sokoloff, Taylor & Zafman LLP

(57) ABSTRACT

Systems and methods for improving indexing are described. In one exemplary method, a 2-level table is used to improve performance when searching an index. A first table contains a subset of more frequently occurring terms and a second and larger table contains terms that occur rarely, with the first table optimized for updating and the second table optimized for searching. The second table is searched only when a search of the first table is unsuccessful. Other methods are described and data processing systems and machine readable media are also described.

18 Claims, 1 Drawing Sheet

INVERTED INDEX PROCESSING

BACKGROUND

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's PhotoShop. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching not only the content of a file, but also by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. This search capability searches through information which is the same for each file, regardless of the type of file. Thus, for example, the searchable data for a Microsoft Word file is the same as the searchable data for an Adobe PhotoShop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. Some file management systems, such as the Finder program, allow users to find a file by searching through the metadata.

In a typical system, the various content, file, and metadata are indexed for later retrieval using a program such as the Finder program, in what is commonly referred to as an inverted index. For example, an inverted index might contain a list of references to documents in which a particular word appears. Given the large numbers of words and documents in which the words may appear, an inverted index can be extremely large. Therefore, one of the many challenges presented in performing searches efficiently is managing the size of the inverted index to improve performance. Certain presently existing techniques to manage the size of the inverted index include compressing the index, but the compression is insufficient to achieve the desired performance improvements.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
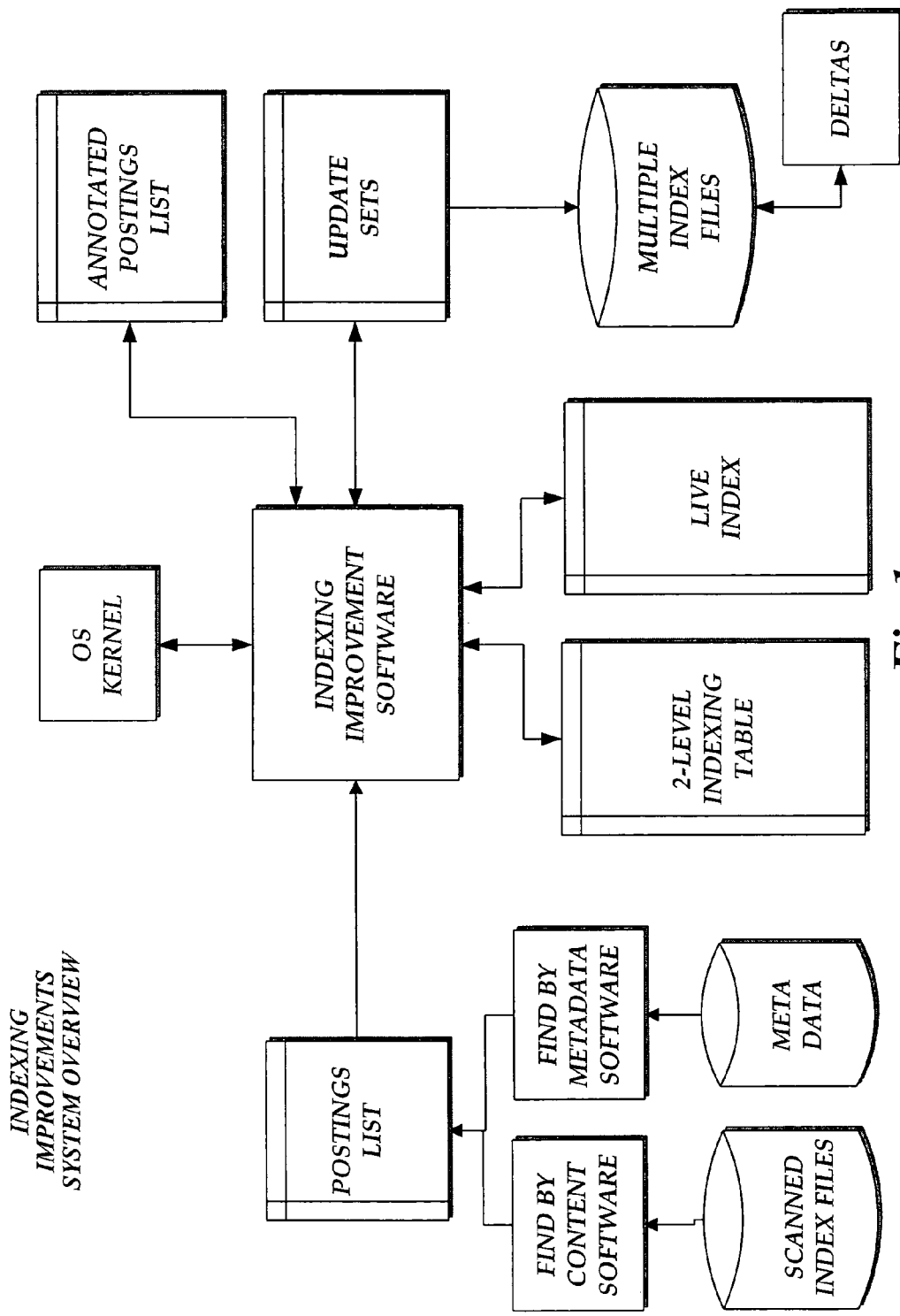
FIG. 1 shows a general example of an architecture for inverted index processing according to one exemplary embodiment of the invention

Methods and systems for improving indexing in a data processing system are described herein.

According to one aspect of the invention, a 2-level table is used for inverting an index. Since some words being far more common than others, one smaller table contains a subset of the more frequently occurring terms, and a larger table contains terms that occur rarely. When scanning, terms are searched for in the smaller table first, and only if not found, are terms searched for in the larger table. The smaller table is optimized for updating, i.e., for making room in the table for inserts, whereas the larger table is optimized only for searching and not updating. The 2-level table may be used for an index of a single document or a corpus of documents and decreases memory pressure and increases performance.

According to one aspect of the invention, updates to a postings list is performed using a write without read postings format. Postings are allocated from contiguous chunks of memory with the last appended item pointing back to the previous item. In this manner, there is a minimum memory footprint for postings writing. In addition, the most recent posting is kept in a table, allowing fast frequency calculation. A storage medium includes memory.

According to one aspect of the invention, the postings file is written backwards and doubled when running out of space. In this manner, during access, the file may be efficiently read in the forward direction, with the occasional large jump backwards in the file, accrued over many forward reads, instead of making many small backwards reads. In addition, old data in the postings file is referenced from new data, thus avoiding writing over all data. Further, all writes to the postings file are appends, improving performance and robustness. Since writes are appends and contiguous, the memory footprint is very small. In addition, the postings entries are stored in term id order, and the term id is stored with each postings entry. In this manner, two postings may have pulses than can be merged with a simple zippering operation. Lastly, because the postings file is always appended to, and by writing the postings file before updating the pointers into it, access to the file can be done without locks.

According to one aspect of the invention, the updates sets of an index are flushed to minimize memory use and maximize disk bandwidth. For example, by sorting the update set in string order, and walking the trie in that order to collect flat store page offsets, grouping the strings by flat store page, then sorting the buckets by page offset, and then inserting the strings in bucket major order, string sorted minor order, the flat store pages can be accessed in disk block order, thus minimizing memory use and maximizing disk bandwidth. In addition, by processing strings for each flat store page in string sorted order, and having strings on the flat store pages in string sorted order, a single cursor is used to point to the last accessed place on the last accessed flat store page to decrease search time for string insertion. When an update set is flushed to disk, it forms a "pulse" on the disk, with the following property: A document id occurring in the pulse cannot occur in any other pulse.

According to one other aspect of the invention, accessing the index is improved by scanning the disk and then sorting the items in time order, and then importing and inserting into the index in strictly that order, the index can return results in the reverse order they were received, and always return the most recent result first. In addition, scanned items are placed into a different index than items from "live" updates. The live index is searched first, to insure that more recent live updates are returned before older scanned updates. In addition, file grouping parameters are stored separately, outside the index, so that the parameters can be read very quickly, and only query results for groups that have not reached their Top-N limit need be evaluated further.

According to yet another aspect of the invention, a delta is stored in an index so that when searching, the delta is found before the normal posting would be found. In this manner, the difficult and time consuming task of updating existing content in an index is avoided. Moreover, deltas are encoded such that they can be stored in another index (eg, live rather than scan) than the index to which they apply, and the updates may be resolved at search time.

According to yet another aspect of the invention, a method is provided to determine where a pulse begins and ends in an index in the absence of any marking to indicate such. By using the fact that the postings list of a single term is a linked list of one or more nodes, with each linked list node corresponding to one pulse, and the invariant that each node points only to older nodes (which are logically ahead in the index), there exists a "closest next node," which is a node pointed to from a node in the current pulse. When searching the index, there is a sorted queue of nodes that need to be accessed. The end of a pulse is detected when the node that is about to be processed next is equal to the closest next node. Since it cannot be known in advance whether more than one pulse has been processed (it is more likely that a group of pulses has been processed), before finalizing processing of one pulse, the method needs to detect one more pulse, or have no more nodes to process. In addition, the method tracks what range of document ids have occurred in each pulse. Since document ids can only occur in one single pulse, the method permits processing of document ids up to the highest one in the most currently read pulse. Lastly, the method provides for handling updates (deltas) when the end of a pulse has been reached, or when we encounter a matching document id, whichever occurs first.

According to one aspect of the invention, a method is provided to use multiple indexes. Updates are made to a "younger" index so that the oldest indexes can be made read only and compacted into a format that is optimized exclusively for fast searching. Changes will be handled by adding deltas to non-compacted indexes.

What is claimed is:

1. A machine implemented method for inverted index processing, the method comprising:
    indexing, by using a computer, items for later retrieval in an inverted index, the inverted index containing postings lists of items in which particular terms occur, the particular terms including terms that have been determined to occur more frequently in the items being indexed, and terms that have been determined to occur less frequently in the items being indexed;
    storing the most frequently occurring terms in a first table of an inverted index, the first table containing postings lists of items in which the more frequently occurring terms occur, the first table optimized for updating a posting list of items in which a more frequently occurring term occurs;
    storing the least frequently occurring terms in a second table of the inverted index, the second table of the inverted index separate from the first table of the inverted index, the second table containing postings lists of items in which the least frequently occurring terms occur, the second table optimized for searching a posting list of items in which a less frequently occurring term occurs;
    searching for a term in the first table;
    searching for a term in the second table only when searching for the term in the first table was unsuccessful; and
    updating the posting list of items in which the searched for term occurs.

2. The method of claim 1, wherein updating the posting list of items in which the searched for term occurs is optimized for the more frequently occurring term using a posting format that minimizes an amount of memory used to post an item in the first table.

3. The method of claim 2, wherein the posting format that minimizes the amount of memory used to post the item in the first table is a write without read posting format.

4. The method of claim 3, wherein the write without read posting format comprises:
    allocating a contiguous chunk of memory used to post items in the first table; and
    appending a new item in the first table so that it points back to a previously posted item in which the searched for term occurs.

5. The method of claim 1, further comprising:
    determining a frequency of occurrence of a term based at least in part on a presence of the term in the first table or the second table; and
    further determining whether the term is a less frequently occurring term or a more frequently occurring term based on the determined frequency.

6. The method of claim 1, wherein the terms occur in at least one item of a corpus of items.

7. A machine implemented data processing system comprising:
    a memory;
    means for indexing items for later retrieval in an inverted index, the inverted index containing postings lists of items in which particular terms occur, the particular terms including terms that have been determined to occur more frequently in the items being indexed, and terms that have been determined to occur less frequently in the items being indexed;
    means for storing the most frequently occurring terms in a first table of an inverted index, the first table containing postings lists of items in which the more frequently occurring terms occur, the first table optimized for updating a posting list of items in which a more frequently occurring term occurs;
    means for storing the least frequently occurring terms in a second table of the inverted index, the second table of the inverted index separate from the first table of the inverted index, the second table containing postings lists of items in which the least frequently occurring terms occur, the second table optimized for searching a posting list of items in which a less frequently occurring term occurs;
    means for searching for a term in the first table;
    means for searching for a term in the second table only when searching for the term in the first table was unsuccessful; and means for updating the posting list of items in which the searched for term occurs.

8. The data processing system of claim 7, wherein the means for updating the posting list of items in which the searched for term occurs is optimized for the more frequently occurring term using a posting format that minimizes an amount of memory used to post an item in the first table.

9. The data processing system of claim 8, wherein the posting format that minimizes the amount of memory used to post the item in the first table is a write without read posting format.

10. The data processing system of claim 9, wherein the write without read posting format comprises:
   means for allocating a contiguous chunk of memory used to post items in the first table; and
   means for appending a new item in the first table so that it points back to a previously posted item in which the searched for term occurs.

11. The data processing system of claim 7, further comprising:
   means for determining a frequency of occurrence of a term based at least in part on a presence of the term in the first table or the second table; and
   means for further determining whether the term is a less frequently occurring term or a more frequently occurring term based on the determined frequency.

12. The data processing system of claim 7, wherein the terms occur in at least one item of a corpus of items.

13. A machine readable storage medium storing instructions that when executed by a data processing system cause the system to perform steps of:
   indexing items for later retrieval in an inverted index, the inverted index containing postings lists of items in which particular terms occur, the particular terms including terms that have been determined to occur more frequently in the items being indexed, and terms that have been determined to occur less frequently in the items being indexed;
   storing the more frequently occurring terms in a first table of an inverted index, the first table containing postings lists of items in which the more frequently occurring terms occur, the first table optimized for updating a posting list of items in which a more frequently occurring term occurs;
   storing the less frequently occurring terms in a second table of the inverted index, the second table of the inverted index separate from the first table of the inverted index, the second table containing postings lists of items in which the less frequently occurring terms occur, the second table optimized for searching a posting list of items in which a less frequently occurring term occurs;
   searching for a term in the first table;
   searching for a term in the second table only when searching for the term in the first table was unsuccessful; and
   updating the posting list of items in which the searched for term occurs.

14. The medium as in claim 13, wherein updating the posting list of items in which the searched for term occurs is optimized for the more frequently occurring term using a posting format that minimizes an amount of memory used to post an item in the first table.

15. The medium as in claim 14, wherein the posting format that minimizes the amount of memory used to post the item in the first table is a write without read posting format.

16. The medium as in claim 15, wherein the write without read posting format comprises:
   allocating a contiguous chunk of memory used to post items in the first table; and
   appending a new item in the first table so that it points back to a previously posted item in which the searched for term occurs.

17. The medium as in claim 13, wherein the method further comprises:
   determining a frequency of occurrence of a term based at least in part on a presence of the term in the first table or the second table; and
   further determining whether the term is a less frequently occurring term or a more frequently occurring term based on the determined frequency.

18. The medium as in claim 13, wherein the terms occur in at least one item of a corpus of items.

* * * * *

UNITED STATES PATENT AND TRADEMARK OFFICE
CERTIFICATE OF CORRECTION

PATENT NO. : 7,783,589 B2
APPLICATION NO. : 11/499038
DATED : August 24, 2010
INVENTOR(S) : John Martin Hornkvist et al.

Page 1 of 1

It is certified that error appears in the above-identified patent and that said Letters Patent is hereby corrected as shown below:

In column 2, line 12, after "invention" insert -- . --.

In column 3, line 66, in claim 1, delete "most" and insert -- more --, therefor.

In column 4, line 5, in claim 1, delete "least" and insert -- less --, therefor.

In column 4, line 9, in claim 1, delete "least" and insert -- less --, therefor.

In column 4, line 51, in claim 1, delete "most" and insert -- more --, therefor.

In column 4, line 57, in claim 1, delete "least" and insert -- less --, therefor.

In column 4, line 61, in claim 1, delete "least" and insert -- less --, therefor.

Signed and Sealed this
Fifteenth Day of November, 2011

David J. Kappos
*Director of the United States Patent and Trademark Office*